Dec. 23, 1952  L. VEYRET  2,622,340
METHOD FOR DRYING FILMS
Filed May 6, 1950
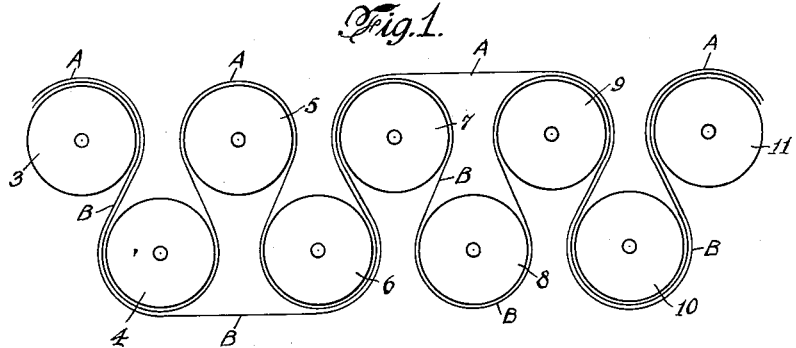
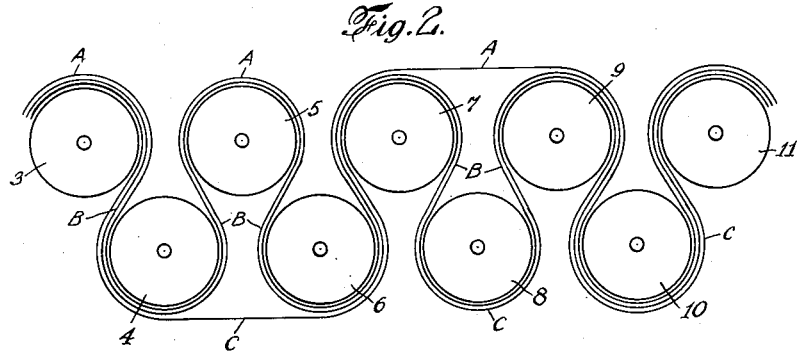
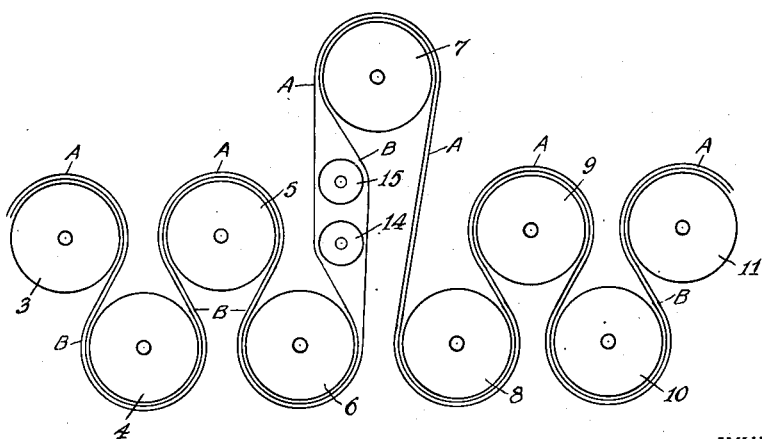
INVENTOR.
LOUIS VEYRET
BY
ATTORNEY Patented Dec. 23, 1952

2,622,340

UNITED STATES PATENT OFFICE 2,622,340

METHOD FOR DRYING FILMS

Louis Veyret, Paris, France, assignor to La Cellophane, Paris, France, a French company Application May 6, 1950, Serial No. 160,435
In France May 10, 1949

3 Claims. (Cl. 34—41)

This invention relates to a method and apparatus for simultaneously drying a plurality of films of hydrophilic material in superimposed layers and more particularly to a method and apparatus for drying superimposed films of regenerated cellulose.

In the early days of the manufacture of films of regenerated cellulose or the like it was suggested that the output of the industry could be increased by simultaneously producing two and even more films by means of two or more extrusion orifices immersed in the coagulating bath, superimposing the different films after their coagulation, and subjecting the composite film to all the finishing treatments usually applied to films of regenerated cellulose. Unfortunately, the process in question was found to be impossible to carry out without drying in as many driers as there are layers because the double or multiple film produced under these conditions could not in practice be separated into its initial elements, that is it was not possible to separate the layers as they left the dryer, in order that the layers might be separately wound without numerous tears occurring. During the drying, the different layers of film material are brought into direct contact and the molecular attractions between the contacting surfaces of two adjacent films is very strong as in the case of two optically plane glass plates, which adhere together very strongly.

The present invention avoids the aforesaid disadvantages and provides a method of readily separating, on discharge from the drier, extruded films treated individually or simultaneously in all the baths.

The nature of the invention will be better understood by referring to the following description, taken in connection with the accompanying drawing in which specific embodiments have been shown for purposes of illustration.

In the drawing:

Figs. 1, 2 and 3 are diagrammatic views illustrating different embodiments of the invention.

In accordance with the invention the films are separated during an early stage of the drying, or are separated only momentarily at a suitable point in the drier, and thereafter reassembled.

Referring to the drawing, Fig. 1 shows a pair of films A and B passing superimposed around a plurality of rolls 3 to 11 of a drier of the usual type. In the drier the film B passes directly from the roll 4 to the roll 6, being thus separated from the film A which passes around the intermediate roll 5. The film A passes directly from the roll 7 to the roll 9, being separated from the film B which passes around the roll 8. The two films then pass through the rest of the drier after having been laid one against the other. Experience has shown that owing to this momentary separation the films separate readily on leaving the drier, even if they have been continuously held together before undergoing the momentary separation under the conditions hereinbefore described. The momentary separation of the two films preferably takes place over two-thirds of the rollers of the drier, but this figure is an example only.

In cases where three films A, B and C have been prepared and superposed with the aid of three extrusion orifices they are separated, for example, as diagrammatically indicated in Fig. 2, from which it will be seen that the two faces of the center film B are successively separated from the films covering them.

In Fig. 2 for example, the film C passes directly from the roll 4 to the roll 6 and the film A passes directly from the roll 7 to the roll 9, thus being separated momentarily from the center film B.

Finally, it is possible to obtain the same result by employing as diagrammatically shown in Fig. 3, two idler rollers 14 and 15 disposed between the two films A and B as they pass from the roll 6 to the roll 7 where they are recombined. The roll 7 is raised to a sufficient height above its normal position to provide clearance for the idler rolls 14 and 15.

The final separation of the different layers of film is further facilitated by impregnation, before drying, with a solution which reduces their adherence, for example in accordance with patent application Serial No. 160,590 filed of even date herewith (French application 572,029). When the films are separated as herein described, more dilute solutions may be employed than those referred to in the said application.

Although the invention has been more particularly described as applied to films of regenerated cellulose, it is obvious that it may be applied to various other hydrophilic films which have undergone moisture treatments, and which are subsequently mechanically separated one or more times during the course of the drying.

What is claimed is:

1. The method of drying superimposed films of regenerated cellulose which comprises partially drying said films individually, then superimposing said films and continuing the passage of the partially dried films through a drying zone in superimposed relationship.

2. The method of drying superimposed films of hydrophilic material which comprises passing the wet films while superimposed over a series of upper and lower rolls in a drying zone and momentarily separating said films by passing the lower film directly over a pair of adjacent lower rolls while the upper film passes over an intermediate upper roll, then passing the upper film directly over a pair of adjacent upper rolls while the lower film passes over an intermediate lower roll.

3. The method of drying superimposed films of regenerated cellulose which comprises passing the wet films while superimposed through a drying zone and during said passage causing momentary separation of said films.

LOUIS VEYRET.

REFERENCES CITED

The following references are of record in the file of this patent:

UNITED STATES PATENTS

| Number | Name | Date |
|---|---|---|
| 242,839 | Page | June 14, 1881 |
| 1,438,511 | Witham | Dec. 12, 1922 |
| 1,973,245 | Bleibler | Sept. 11, 1934 |
| 1,974,453 | Gallaudet | Sept. 25, 1934 |
| 2,019,649 | Berry | Nov. 5, 1935 |
| 2,224,803 | Standley | Dec. 10, 1940 |
| 2,345,541 | Scholze | Mar. 28, 1944 |
| 2,433,122 | Hornbostel | Dec. 23, 1947 |